(12) United States Patent
Wu et al.

(10) Patent No.: US 7,147,947 B2
(45) Date of Patent: Dec. 12, 2006

(54) SELECTIVE CARBON MONOXIDE OXIDATION CATALYST, METHOD OF MAKING THE SAME AND SYSTEMS USING THE SAME

(75) Inventors: Ming-Cheng Wu, Rochester Hills, MI (US); Jeffrey G. Weissman, Broken Arrow, OK (US)

(73) Assignee: Delphi Technologies, Inc., Troy, MI (US)

( * ) Notice: Subject to any disclaimer, the term of this patent is extended or adjusted under 35 U.S.C. 154(b) by 475 days.

(21) Appl. No.: 10/084,281

(22) Filed: Feb. 25, 2002

(65) Prior Publication Data

US 2003/0162656 A1    Aug. 28, 2003

(51) Int. Cl.
*H01M 8/02* (2006.01)
(52) U.S. Cl. .............................. 429/17; 429/19; 429/40
(58) Field of Classification Search ................ 502/325, 502/339, 349; 429/17, 19
See application file for complete search history.

(56) References Cited

U.S. PATENT DOCUMENTS

| | | | |
|---|---|---|---|
| 3,607,728 A * | 9/1971 | Wilhelm .................. 208/111.1 |
| 3,666,813 A * | 5/1972 | Hindin et al. ................ 564/417 |
| 4,504,593 A * | 3/1985 | Trinh Dinh et al. ......... 502/154 |
| 4,620,034 A * | 10/1986 | Smits ........................ 562/531 |
| 5,612,012 A * | 3/1997 | Soma et al. ................. 423/246 |
| 5,702,838 A * | 12/1997 | Yasumoto et al. ............ 429/40 |
| 5,849,657 A * | 12/1998 | Rotgerink et al. .......... 502/223 |
| 6,077,489 A * | 6/2000 | Klein et al. .............. 423/213.5 |
| 6,162,558 A * | 12/2000 | Borup et al. .................. 429/19 |
| 6,245,214 B1 * | 6/2001 | Rehg et al. ................. 205/764 |
| 6,280,864 B1 * | 8/2001 | Towler et al. ................. 429/17 |
| 6,290,913 B1 * | 9/2001 | Aoyama ..................... 422/110 |
| 6,299,995 B1 * | 10/2001 | Abdo et al. ................... 429/17 |
| 6,365,118 B1 | 4/2002 | Kharas et al. |
| 6,416,894 B1 * | 7/2002 | Aoyama ..................... 429/20 |
| 6,468,941 B1 | 10/2002 | Bortun et al. |
| 6,585,944 B1 | 7/2003 | Nunan et al. |
| 6,605,264 B1 | 8/2003 | Bortun et al. |
| 6,643,928 B1 | 11/2003 | Hardesty et al. |

OTHER PUBLICATIONS

J. Goetz, M.A. Volpe, C.E. Gigola, and R. Touroude; "Low-Loaded Pd-Pb/α-Al$_2$O$_3$ Catalysts: Effect of Alloying in the Hydrogenation of Buta-1,3-diene and Hydrogenation and Isomerization of Butenes", Journal of Catalysis 199, pp. 338-345 (2001).

Dong Hyun Kim, Mee Sook Lim, "Kinetics of selective CO oxidation in hydrogen-rich mixtures on Pt/alumina catalysts", Applied Catalysis A: General 224 (2002) 27-38.

Akkarat Manasilp, Erdogan Gulari, "Selective CO oxidation over Pt/alumina catalysts for fuel cell applications", Applied Catalysis B: Environmental 37 (2002) 17-25.

* cited by examiner

*Primary Examiner*—Christina Johnson
(74) *Attorney, Agent, or Firm*—Paul L. Marshall

(57) ABSTRACT

A CO-selective catalyst comprises a catalytic material, wherein the catalytic material is selected from the group consisting of Pt, Pd, Rh, Ir, Os, Ru, Ta, Zr, Y, Ce, Ni, Cu, and oxides, alloys, compounds, and combinations comprising at least one of the foregoing; a modifying agent selected from the group consisting of Pb, Bi, Ge, Si, Sb, As, P, and combinations comprising at least one of the foregoing; and a support.

In one embodiment, the method for forming the CO selective catalyst comprises combining a catalytic material and a support with about 2 to about 25 atomic percent of a modifying agent, based on the total surface atoms of the catalytic material, to form a modified catalyst-containing support and disposing the modified catalyst-containing support on or into a substrate.

12 Claims, 6 Drawing Sheets

SELECTIVE CARBON MONOXIDE OXIDATION CATALYST, METHOD OF MAKING THE SAME AND SYSTEMS USING THE SAME

BACKGROUND OF THE INVENTION

The present disclosure relates to a catalyst, a method of forming the catalyst, and applications of the catalyst, and more particularly to a catalyst useful for oxidizing carbon monoxide selectively in a hydrogen rich environment.

Exhaust gases, such as those produced by a partial oxidation, autothermal, or steam reforming reaction of hydrocarbons, to produce a hydrogen ($H_2$) rich reformate, are passed through a catalytic converter to remove undesirable components such as carbon monoxide (CO). Significant amounts of CO, which serve to diminish the functionality of precious metals found in components downstream of the reforming reactor, for example, precious metals found in a proton-electrolytic membrane fuel cell anode, are present in the $H_2$-rich reformate. Conventional oxidation catalysts (e.g., platinum (Pt), rhodium (Rh), or iridium (Ir)) are currently used for CO removal. However, these precious metal containing catalysts are not selective to CO oxidation, and the oxidation of hydrogen by these catalysts is also significant. Therefore, in order to maximize CO oxidation activity, while minimizing $H_2$ oxidation activity, most existing CO preferential oxidation catalysts operate over a very narrow temperature range in which the CO oxidation activity is relatively high compared to the $H_2$ oxidation activity, although some $H_2$ oxidation occurs. The use of such a narrow temperature range presents a difficult process control situation. Thus there remains a need in the art for a catalyst that is preferentially selective to CO over $H_2$, and which can be used over a wide temperature range, thus eliminating the need for a sophisticated process control system, and thereby resulting in a simpler, more efficient, and less expensive fuel processing system.

SUMMARY OF THE INVENTION

Disclosed herein is a CO selective catalyst, methods for making the same, and systems employing the same. A CO-selective catalyst comprises a catalytic material, wherein the catalytic material is selected from the group consisting of Pt, Pd, Rh, Ir, Os, Ru, Ta, Zr, Y, Ce, Ni, Cu, and oxides, alloys, compounds, and combinations comprising at least one of the foregoing; a modifying agent selected from the group consisting of Pb, Bi, Ge, Si, Sb, As, P, and combinations comprising at least one of the foregoing; and a support.

In one embodiment, the method for forming the CO selective catalyst comprises combining a catalytic material and a support with about 2 to about 25 atomic percent of a modifying agent, based on the total surface atoms of the catalytic material, to form a modified catalyst-containing support and disposing the modified catalyst-containing support on or into a substrate.

The above described and other features are exemplified by the detailed description and accompanying drawings.

BRIEF DESCRIPTION OF THE DRAWINGS

Referring now to the drawings wherein like elements are numbed alike in the several figures.

DESCRIPTION OF THE PREFERRED EMBODIMENT

Figure 1:
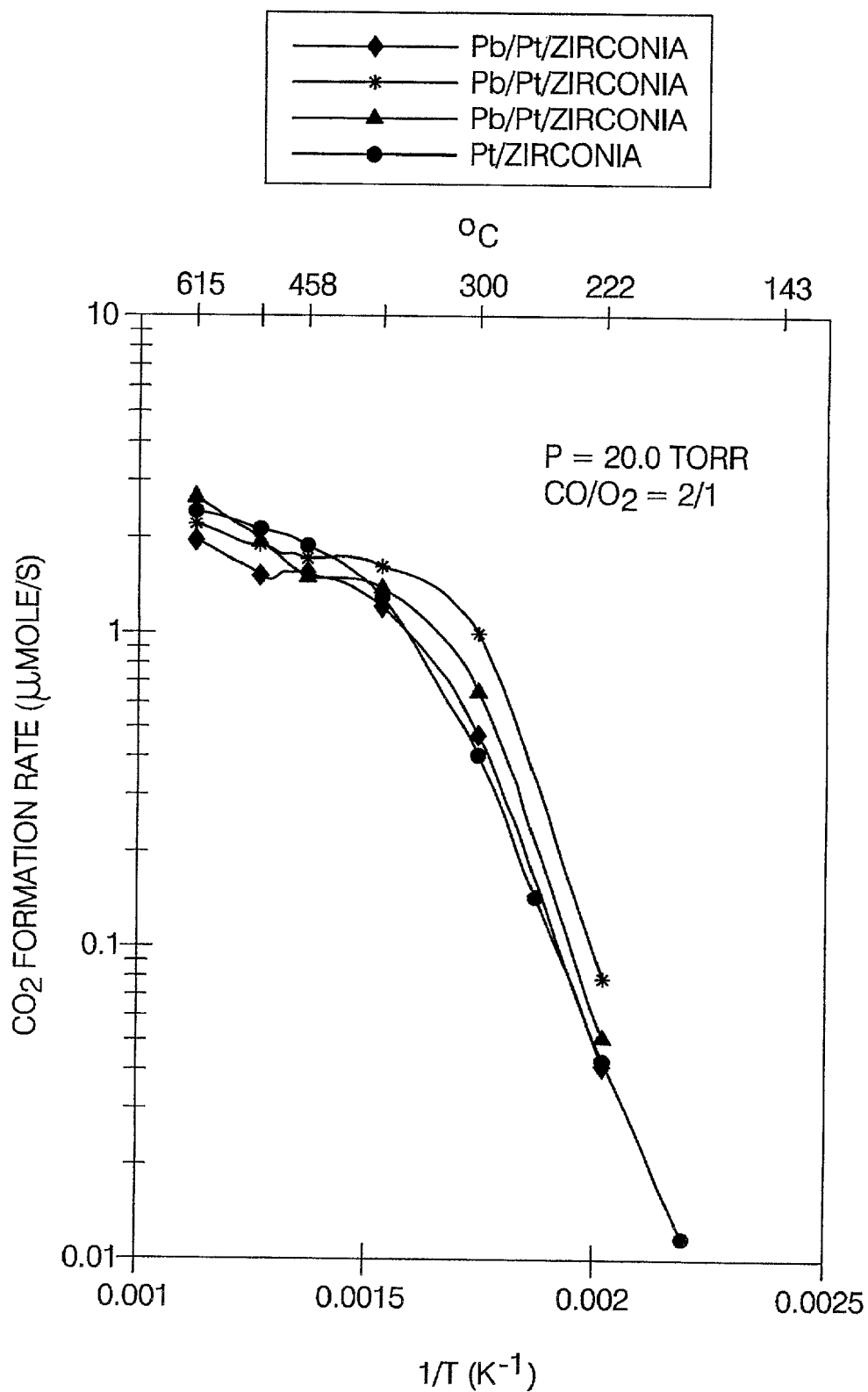
FIG. 1 is a graph illustrating the CO oxidation rates over the Pb-containing Pt catalyst and the Pt-only catalyst supported on zirconia in a CO and $O_2$ mixture.

The CO-selective catalyst alleviates the current problems faced when catalysts comprising a precious metal are employed for CO oxidation, as the present CO-selective catalyst, comprising a modifying agent, is selective to removal of CO in preference to $H_2$ and hydrocarbon (HC) (e.g., propylene ($C_3H_6$), methane ($CH_4$), and the like) removal. Furthermore, the CO-selective catalyst is capable of operating over a greater temperature range than catalysts without a modifying agent. Therefore, in a reforming derived $H_2$ rich feed, the catalyst of the present disclosure results in the removal of CO with a low waste of hydrogen (e.g., less than about 3 mole % oxidation of $H_2$) over wide temperature ranges (e.g., over temperatures ranges greater than about 200° C.), resulting in a simple and efficient catalytic system.

The CO-selective catalyst comprises a catalytic material in combination with a modifying agent and a support. The catalytic material may include metals, such as platinum (Pt), palladium (Pd), rhodium (Rh), iridium (Ir), osmium (Os), ruthenium (Ru), tantalum (Ta), zirconium (Zr), yttrium (Y), cerium (Ce), nickel (Ni), copper (Cu), and the like, as well as oxides, compounds, alloys, and combinations comprising at least one of the foregoing catalytic materials, wherein catalytic materials comprising Pt, Rh, Pd, and Ir are particularly preferred.

The modifying agent is any agent capable of conferring selectivity onto the CO-selective catalyst such that CO is selectively removed over other materials, such as $H_2$ or HC, and that can withstand the operating temperatures in which the catalyst will be employed. Preferably, the modifying agent will further confer a large operating temperature range, e.g., 200° C. or more, on the CO-selective catalyst product. Preferable modifying agents include, but are not limited to, lead (Pb), bismuth (Bi), germanium (Ge), silicon (Si), antimony (Sb), arsenic (As), and phosphorous (P), and alloys, nitrates, sulfides, chlorides, and modifying agents, and combinations comprising at least one of the foregoing, with Pb particularly preferred.

The ratio of modifying agent to catalytic material may vary, but should be sufficient to maintain CO selectivity over desired temperature ranges. A preferred ratio is about 0.025 to about 0.125 parts of modifying agent to catalytic material, where about 0.04 to about 0.10 parts is more preferred, and about 0.05 to about 0.075 parts is even more preferred.

The modifying agent and catalytic material are preferably deposited onto a support. The support may comprise metal oxides, such as alumina, zirconia, titania, and combinations comprising at least one of the foregoing metal oxides. Ideally, the catalytic material is deposited onto the support by vapor deposition, sputtering, mixing, chemical-absorbing, physical absorption, and the like, to form a catalyst-containing support. Deposition of the modifying agent onto the support can be sequential or simultaneous to the deposition of the catalytic material on or into the support. When the modifying agent has been added to the catalyst-containing support, the combination is referred to as a modified catalyst-containing support.

For example, where the catalytic material is already disposed on or into the support to form a mixture, the modifying agent can be disposed on or into this mixture by placing the mixture in a heating chamber, wherein the heating chamber is painted or coated with a glass or ink comprising a modifying agent. The modifying agent may comprise Pb, Bi, Ge, Si, Sb, As, P, and alloys, nitrates, sulfides, chlorides, and modifying agents, and combinations comprising at least one of the foregoing. The heating chamber can then be heated such that the modifying agent vaporizes and deposits onto the mixture to form a modified catalyst-containing support. The temperature of the chamber can be any temperature sufficient to vapor deposit the modifying agent. For example, temperatures of about 800 to about 1,200° C. can be employed, where about 900 to about 1,100° C. is preferred, and about 950 to about 1,050° C. is more preferred.

In the method employing the heating chamber, the amount of modifying agent deposited onto the mixture can be controlled by varying the temperature in the heating chamber, by varying the length of time that the mixture is heated in the heating chamber, and/or by varying the concentration of the modifying agent in the glass or ink. The resulting modified catalyst-containing support can then be applied on or into a substrate by washcoating, imbibing, impregnating, physisorbing, chemisorbing, precipitating, and the like to form the CO-selective catalyst.

An alternative method of disposing the modifying agent and the catalytic material on or into the support includes simultaneously combining the support, modifying agent, and the catalytic material. Essentially, a slurry is formed comprising all of the components. For example, a slurry comprising the support, e.g., an alumina slurry, is combined with the catalytic material and the modifying agent to form a slurry. The pH of the slurry can then be adjusted with an appropriate adjuster (e.g., sodium hydroxide (NaOH), tetramethylammonium hydroxide (TMAOH), nitric acid, and the like) to attain both the desired deposition onto the support and the desired properties for subsequent steps, such as deposition onto a substrate. Preferably, the pH is adjusted to less than or equal to about 4.5, with a pH of about 2.5 to about 4.0 more preferred, and about 3.0 to about 3.5 even more preferred. After sufficient aging, to deposit the modifying agent and the catalytic material on or into the support, e.g., from a few minutes to several hours, the slurry can be deposited onto a substrate. Deposition onto the substrate can be accomplished by various techniques, including washcoating, impregnating, imbibing, physisorbing, chemisorbing, precipitating, dipping, spraying, painting, and the like. After applying the slurry to the substrate, the resulting product can be dried and/or calcined to form the CO-selective catalyst. Calcination can occur at temperatures of about 400° C. to about 1,000° C., for about 1 to about 12 hours. If desired, the average particle size of support particles contained in the slurry can be controlled, by commonly used practices such as grinding, ball milling, hammer milling, agitation, cavitation, and the like. While no average particle size is preferred over any other, certain particle size ranges may prove optimum depending on the nature of the substrate and the desired concentrations of support, catalytic material, and modifying agent. For example, an average particle size of about 1 to about 50 micrometers may prove more useful, with an average particle size range of about 3 to about 6 micrometers preferred, and within this range less than about 5 micrometers more preferred.

In the slurry, the support, e.g., alumina or the like, may comprise about 5 to about 65 weight percent (wt %) of the slurry, with about 35 to about 42 wt % preferred, and about 38 to about 40 wt % particularly preferred, wherein weight percent is by weight solids based upon the total weight of the slurry. The catalytic material is preferably introduced to the slurry in the form of a catalytic material solution, wherein the catalytic material solution can comprise a nitrate, sulfide, chloride, organic salt, and the like in solution, and combinations comprising at least one of the foregoing. An exemplary catalytic material solution comprises a platinum nitrate in water solution, wherein the platinum comprises about 1 to about 75 wt % of the nitrate solution, with about 13 to about 20 wt % preferred, and about 15 to about 19 wt % particularly preferred, where weight percent is based on the platinum weight of the total nitrate solution.

Similar to the catalytic material, the modifying agent is preferably introduced in a modifying agent solution, wherein the modifying agent solution can comprise a nitrate, sulfide, chloride, organic salt, and the like in solution, and combinations comprising at least one of the foregoing. An exemplary modifying agent solution comprises a lead nitrate in water solution, with the lead comprising about 1 to about 80 wt % of the nitrate solution, with about 58 to about 68 wt % preferred, and about 60 to about 65 wt % particularly preferred, where weight percent is based on the lead weight of the total nitrate solution.

Once the modifying agent and catalytic material are disposed onto the support, the now modified catalyst-containing support can be disposed onto or in a substrate to form the CO-selective catalyst. The substrate may comprise any material having a sufficient surface area and structural integrity to support the catalyst. In an exemplary embodiment, the substrate may be designed for use in any system exposed to fuel-rich feed stocks where preferential CO-selectivity is desirable, such as in a fuel cell system (e.g., in a proton exchange membrane (PEM) fuel cell system), in a vehicle exhaust system (e.g., in conjunction with a non-thermal plasma reactor(s), a catalytic converter(s), and/or a particulate trap(s)). The substrate should further be stable in the operating environment, e.g., often temperatures of up to about 500° C. and greater, exposure to HC, nitrogen oxides ($NO_x$), CO, carbon dioxide ($CO_2$), sulfur (S), sulfur oxides ($SO_x$), and the like, and combinations comprising at least one of the foregoing. Some possible substrates include ceramic, cordierite, glasses, metal, metal oxides (e.g., alumina, zirconia, and the like), and the like, as well as cermets, alloys, and combinations comprising at least one of the foregoing substrates. Some ceramic materials include "HONEY CERAM", commercially available from NGK-Locke, Inc, Southfield, Mich., and "CELCOR", commercially available from Corning, Inc., Corning, N.Y.

Although the substrate can have any size or geometry, the size and geometry are preferably chosen to optimize surface area in the given catalyst design parameters. For example, the substrate can have a honeycomb geometry, with the combs being any multi-sided or rounded shape, with substantially square, triangular, pentagonal, hexagonal, heptagonal, or octagonal or similar geometry's preferred due to ease of manufacturing and increased surface area. These substrates can be in the form of foils, porous structures (e.g., porous glasses, ceramics, metal oxides, metallic foams, and the like), monoliths (e.g., a honeycomb structure, and the like), and the like, as well as combinations comprising at least one of the foregoing forms. Substrates can have about 10 to about 1,600 pores per square inch ($ppi^2$), with about 10 to about 80 $ppi^2$ more preferred if employing a foam, with about 20 to about 45 $ppi^2$ more preferred if employing a foam; and with about 200 to about 600 $ppi^2$ preferred if employing a monolith.

The loading content of the modifying agent, catalytic material, support, and any other components on the substrate can be up to about 10 to about 500 grams per cubic foot ($g/ft^3$) of substrate volume, on a dry, water or solvent free, basis. Preferably, within this range, the loading is greater than or equal to about 20 $g/ft^3$, with about 50 to greater than or equal to about 250 $g/ft^3$ more preferred. Also preferred in this range is a loading of less than or equal to about 125 $g/ft^3$, with greater than or equal to about 50 $g/ft^3$ more preferred. These loadings are particularly preferred on foam substrates comprising greater than or equal to about 20 to about 45 $ppi^2$ or monolithic substrates having about 200 to about 600 $ppi^2$. These preferred loadings may need to be adjusted when using substrates with ppi's outside of this range.

The loading content, on a dry, water and solvent free basis, is about 0.5 to about 5 wt % of the catalytic material and about 0.01 to about 0.5 wt % of the modifying agent, based upon the total dry weight of the washcoat (i.e., the support, catalytic material, and modifying agent). Within this range, the catalytic material loading is preferably greater than or equal to about 1.0 wt %, with greater than or equal to about 1.8 wt % more preferred, while the modifying agent loading is greater than or equal to about 0.05 wt %, with greater than or equal to about 0.10 wt % more preferred. Also preferred within this range is a catalytic material loading less than or equal to about 3.5 wt %, with less than or equal to about 2.5 wt % more preferred, while the modifying agent loading is less than or equal to about 0.30 wt %, with less than or equal to about 0.20 wt % more preferred.

Alternatively, the amount of modifying agent preferably disposed on the surface of the catalyst composition comprises about 2 to about 25 atomic percent, with about 5 to about 20 atomic percent particularly preferred, and about 8 to about 15 atomic percent more preferred. Atomic percent is herein defined as the number of atoms of the modifying agent that are present in 100 surface atoms of the catalytic material, e.g., the number of Pb atoms present in 100 atoms of Pt on the surface of the catalyst composition. The CO oxidation reaction is known to proceed over a single surface Pt site. If the catalyst surface is only partially covered by Pb (e.g. 25 atomic percent surface coverage), the remaining surface sites are still effective in oxidizing CO. In contrast to the CO oxidation reaction, $H_2$ oxidation and $C_3H_6$ oxidation require multiple surface sites. For example, if Pb poisons every other site, these reactions would be suppressed entirely. Note that this is a proposed mechanism of this invention, and should not be limiting as to the usefulness or application of this invention.

Figure 2:
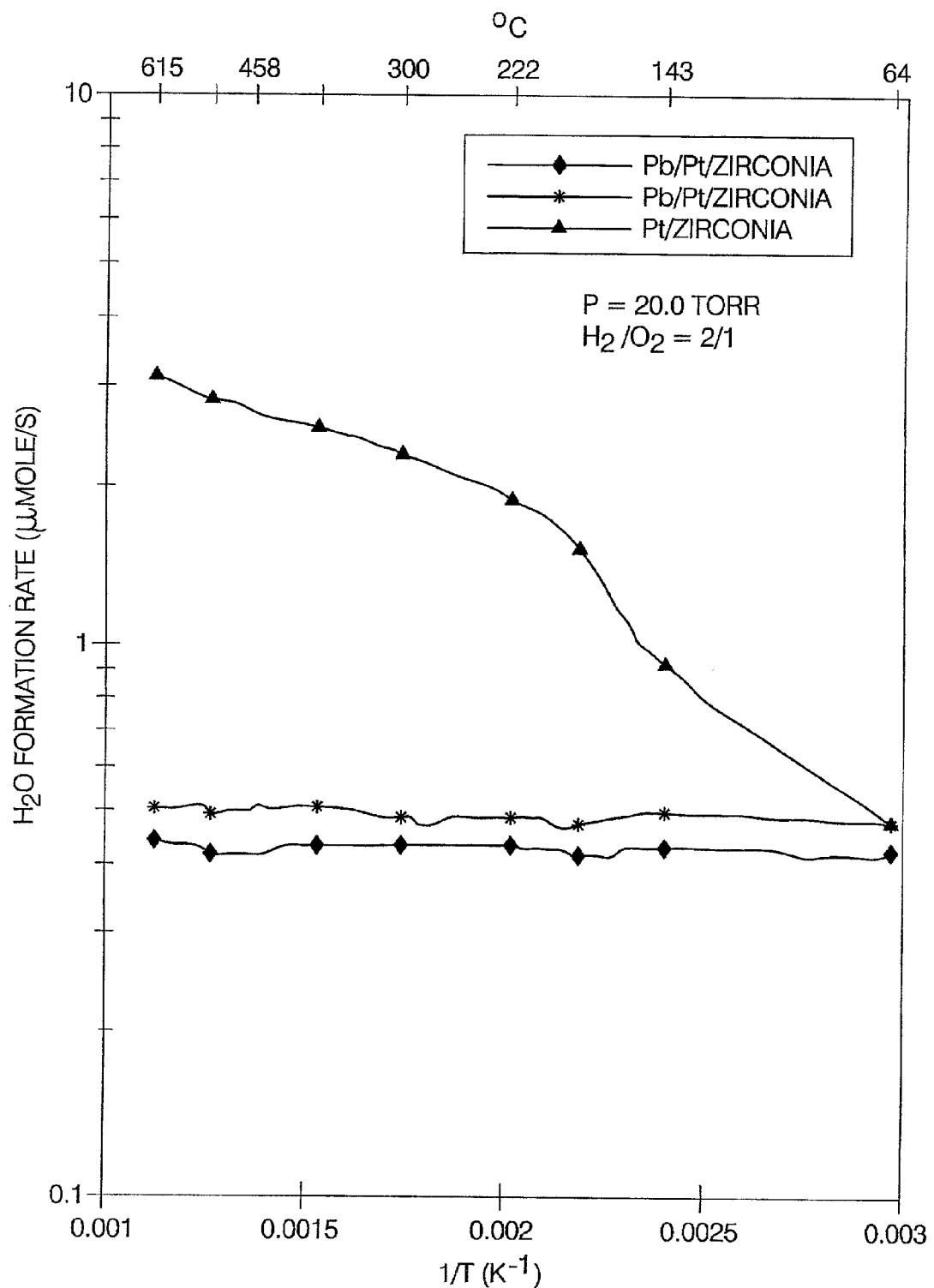
FIG. 2 is a graph illustrating the $H_2$ oxidation rates over the Pb-containing Pt catalysts and the Pt-only catalyst supported on zirconia in a $H_2$ and $O_2$ mixture.
Figure 3:
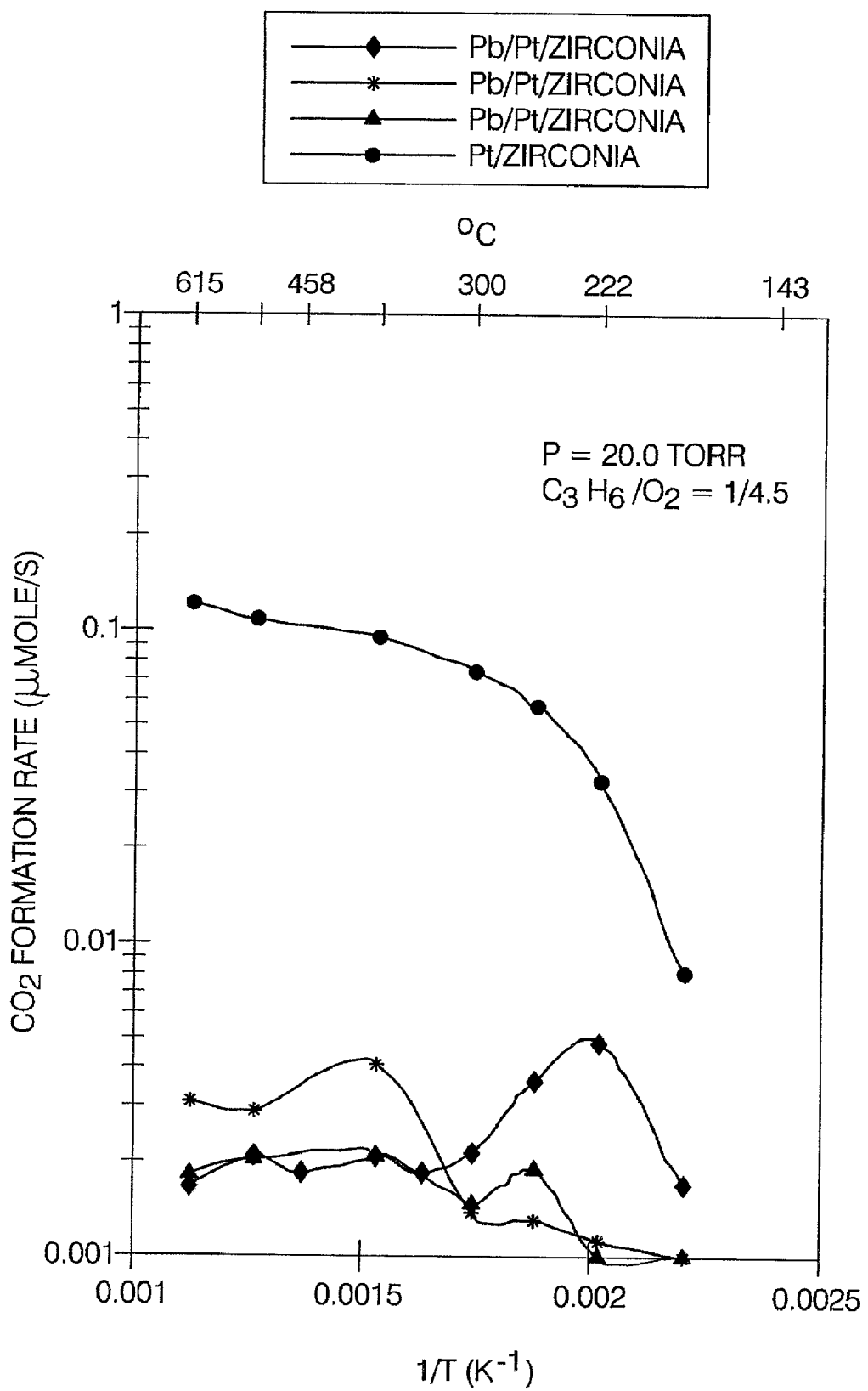
FIG. 3 is a graph illustrating propylene ($C_3H_6$) oxidation rates over the Pb-containing Pt catalysts and the Pt-only catalyst supported on zirconia in a $C_3H_6$ and $O_2$ mixture.

As shown in FIGS. 1–3, the CO-selective catalyst exhibits exemplary performance in selectively removing CO over other materials. In particular, the catalyst shows exemplary performance in selecting CO for removal from $H_2$ or $C_3H_6$, with little or no loss of $H_2$ or $C_3H_6$ from their respective binary gas mixtures. In FIG. 1, the oxidation reactions were carried out in a $CO/O_2$ mixture with a $CO/O_2$ ratio of 2 and at a reactor pressure of 20 Torr. In FIG. 2, the oxidation reactions were carried out in a $H_2/O_2$ mixture with a $H_2/O_2$ ratio of 2 and at a reactor pressure of 20 Torr. In FIG. 3, the oxidation reactions were carried out in a $C_3H_6/O_2$ mixture with a $C_3H_6/O_2$ ratio of 0.34 and at a reactor pressure of 20 Torr.

As shown in FIG. 1, the Pb-containing catalysts (represented by diamonds, asterisks, and triangles) formed according to the disclosure herein, and a non-Pb containing catalyst (represented by the open circle) oxidize CO at about the same rates when exposed to the same temperatures. More specifically, at temperatures of about 615° C., all four catalysts oxidize CO at about 2.0 to about 3.0 micromoles/second; at temperatures of about 458° C., all four catalysts oxidize CO at about 1.0 to about 2.0 micromoles/second; at temperatures of about 300° C., the catalysts oxidize CO at about 0.3 to about 1.0 micromoles/second; at temperatures of about 222° C., all four catalysts oxidize CO at about 0.04 to about 0.08 micromoles/second. Therefore, the addition of the modifying agent does not suppress CO oxidation.

However, as shown in FIG. 2, the Pb-containing catalysts (diamonds and asterisks) show upwards of up to about 100% inhibition of $H_2$ oxidation in comparison to the non-Pb containing catalyst (triangles) which shows $H_2$ oxidation rates of about 1.5 to about 3.0 micromoles/second at temperatures of about 150 to about 615° C. As shown in FIG. 3, the Pb-containing catalysts (diamonds, asterisks, and triangles) show upwards of up to about 100% inhibition of $C_3H_6$ oxidation rates in comparison to the non-Pb containing catalyst (circles) which shows $C_3H_6$ oxidation rates of about 0.03 to about 0.115 micromoles/second at temperatures of about 220 to about 615° C.

Therefore, the data from FIGS. 2 and 3, taken in conjunction with FIG. 1, indicates then that the $H_2$ and HC contained in the catalyst's environment are reserved and that CO is selectively oxidized. The CO-selective catalyst, therefore, poses as an ideal catalyst in those environments in which the selective removal of CO and the conservation of $H_2$ or HC is highly desirable.

An application of the CO-selective catalyst is in a system exposed to fuel-rich feed stocks where preferential CO-oxidation is desired. An exemplary system includes a system comprising a fuel reforming process, wherein the fuel reforming process partially oxidizes hydrocarbons, in sufficient air, to form a mixture of $H_2$, CO, $CO_2$, $H_2O$, nitrogen ($N_2$), and argon (Ar), with no air-derived $O_2$ in the product. An exemplary fuel cell system comprises a PEM fuel cell, fuel reformer(s), and a CO selective reformer(s) comprising the CO-selective catalyst. Possible fuel reformers include auto-thermal reformers, preferential oxidation reformers, steam reformers, and the like, as well as combinations comprising at least one of the foregoing reformers. Possible CO selective reformers include high, moderate, or low temperature water-gas shift steps and CO oxidation steps, and the like, as well as combinations comprising at least one of the foregoing reformers.

The fuel reformer converts fuels into $H_2$, $CO_2$, and other byproducts, such as CO, $N_2$, and Ar. Possible sources of fuel include fuels such as hydrocarbon fuels, including, but not limited to, liquid fuels, such as gasoline, diesel fuel, ethanol, methanol, kerosene, and others; gaseous fuels, such as natural gas, propane, butane, and others; and alternative fuels, such as hydrogen, biofuels, dimethyl ether, and others; and combinations comprising at least one of the foregoing fuels. Preferred fuels are typically that that can be more readily vaporized and/or fuels that are readily available to consumers. The reformed fuel stream can contain high levels of CO (greater than 10,000 parts per million (ppm)) capable of "poisoning" a precious-metal containing catalyst, such as found on a PEM fuel cell anode, by binding to the catalyst thereby inhibiting $H_2$ fuel from being oxidized. Typically achieving levels that are less than 100 ppm to less than 10 ppm of CO in the reformed fuel stream is desired to avoid catalyst poisoning of the PEM fuel cell.

Figure 4:
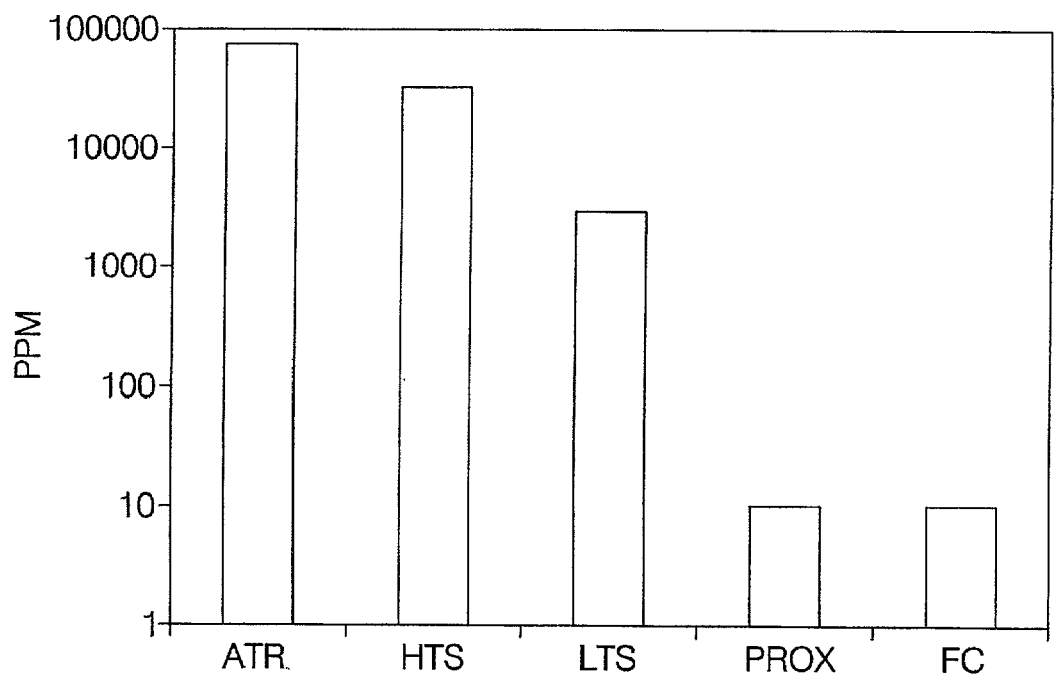
FIG. 4 is a graph illustrating CO concentrations after the various reaction steps in a proton exchange membrane fuel processor.

CO-selective reformers, such as water-gas shift reactors comprising both high temperature shift (HTS) conversion reactors and low-temperature shift (LTS) conversion reactors, and preferential CO-oxidation (PROX) reactors reduce the CO concentrations formed by the fuel reformer. As shown in FIG. 4, these types of CO selective reformers can be used to reduce the CO concentration from about 100,000 ppm, or higher, in the fuel reformer (ATR) to about 10,000 ppm in the HTS conversion reactors; to about 1,000 ppm in the LTS conversion reactor; and then to about 10 ppm in the PROX reactor. A stream comprising this low concentration of CO can then be employed in a PEM fuel cell (FC).

HTS conversion reactors, which typically operate at about 350 to about 550° C., and LTS conversion reactors, which typically operate at about 200 to about 300° C., react CO generated from the reformer with steam to form $H_2$ and $CO_2$ over the water-gas shift catalysts. These reactors, as well as the PROX reactor, can employ the CO-selective catalyst disclosed herein.

Figure 5:
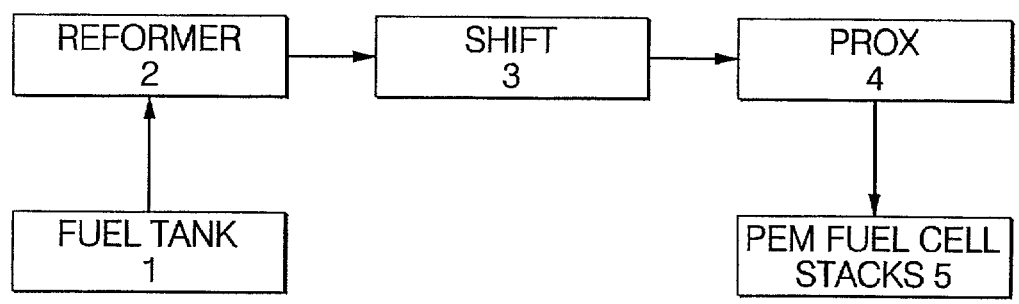
FIG. 5 is a schematic of a proton exchange membrane fuel processor.

A fuel cell system 100 is schematically depicted in FIG. 5. As shown in FIG. 5, the fuel tank 1 supplies the fuel reformer 2 with fuel, and the fuel reformer 2 converts the fuel into predominantly $H_2$ and CO. This product is then passed through a water-gas shift reactor 3 (optionally comprising the CO selective catalyst), wherein the constituent parts are mixed with water to produce a product having increased amounts of $H_2$ and depleted amounts of CO. The water-gas shift reaction may be followed by one or more CO preferential oxidation steps conducted by the PROX reactor 4. The preferential oxidation step involves reacting the products of the water/gas shift reaction with air, in order to convert remaining CO to $CO_2$ without significantly diminishing the concentration of the desired $H_2$ product. Such a $H_2$ rich, CO depleted gas can be used as a feed reactant to a PEM fuel cell 5.

Another application of the CO-selective catalyst is in an internal exhaust system, wherein the internal exhaust system comprises an internal combustion engine in fluid communication with the CO-selective catalyst. Other optional components comprise a non-thermal plasma (NTP) reactor(s), particulate trap(s), catalytic converter(s), and the like, as well as various combinations comprising at least one of the foregoing. These components may be arranged in various fashions that enable fluid communication there between, with the CO-selective catalyst preferably disposed upstream of the NTP and/or the catalytic converter.

The CO-selective catalyst is further illustrated by the following non-limiting examples, wherein data is shown to detail the efficiency of the CO-selective catalyst over wide ranges of temperature.

EXAMPLES

Example 1

Catalyst Formulation and Preparation

Unmodified platinum catalyst (Catalyst A) is prepared by first making a slurry of alumina in water, containing 41.7 wt % solids. To 240 grams (g) of this slurry is added 8.31 g of a platinum nitrate solution, containing 24.54 wt % platinum. This metal containing slurry is adjusted with nitric acid or TMAOH to give a final pH of about 3.0 and allowed to age. After aging, the slurry is washcoated onto a 20 pore per inch (ppi) cordierite foam, of size 1 inch diameter by 1 inch high. This coated part is heated in flowing air at 600° C. for 1 hour. The final loading of platinum on the dried, washcoated part is 2.44 g of platinum per cubic inch of part (g/in$^3$), with the washcoat containing 2 wt % of platinum.

Lead modified platinum catalysts (Catalyst B, C, and D) are prepared in a similar manner. Catalyst B, for example, is prepared by first making a slurry of alumina in water, containing 39.3 wt % by solids. To 1,273 g of this slurry is added 56.19 g of a platinum nitrate solution, containing 18.17 wt % of platinum and 0.82 g of lead nitrate, containing 62.56 wt % of lead. This metal containing slurry is adjusted with nitric acid or TMAOH to give a final pH of about 3.5 and allowed to age. After aging, this slurry is washcoated onto a 45 ppi cordierite foam, of size 1 inch diameter by 1 inch high. This coated part was heated in flowing air, at 600 ° C. for 1 hour. The final loading of platinum on the dried, washcoated part was 2.06 g/in$^3$ of Pt, with the washcoat containing 2 wt % of platinum and 0.10 wt % of lead, wherein weight percent is based on the total weight of the solid washcoat.

The final loading of platinum on the dried, washcoated part of catalyst C was 2.06 g/in$^3$ of Pt, with the washcoat containing 2 wt % of platinum and 0.15 wt % of lead, wherein weight percent is based on the total weight of the solid washcoat.

The final loading of platinum on the dried, washcoated part of catalyst D was 1.75 g/in$^3$ of Pt, with the washcoat containing 2 wt % of platinum and 0.15 wt % of lead, wherein weight percent is based on the total weight of the solid washcoat. This slurry prepared for catalyst D was washcoated onto a 20 ppi zirconium oxide modified aluminum oxide foam, of size 1 inch diameter by 1 inch high.

Example 2

Catalyst Performance in Simulated Reforming Derived Hydrogen Feeds

The catalysts of Example 1 were tested based on their ability to convert CO into $CO_2$, convert $H_2$ into $H_2O$, and for the selectivity of $O_2$ over a wide range of temperatures. Catalysts A, B, C, and D were tested separately in the same tubular flow reactor. Feed gases were passed over a catalyst, contained in a steel tube provided with an external heat source, and the reaction products were cooled for condensation of liquids, and the gas analyzed using a gas chromatograph. The temperature of the reaction was varied incrementally from about 180° C.–400° C., the reaction being allowed to come to equilibrium after each change in temperature. After reaching equilibrium, the products were measured.

For each temperature, hydrogen conversion, CO conversion, and $O_2$ selectivity were determined according to the formulas:

$H_2$ conversion=$([H_2]_f-[H_2]_p)/[H_2]_f$

CO conversion=$([CO]_f-[CO]_p)/[CO]_f$ $O_2$ selectivity=$([CO]_p-[CO]_f)/2([O_2]_p-[O_2]_f)$ where f and p indicate concentrations in the feed and product. $O_2$ selectivity is a measure of how effectively available oxygen reacted with available CO, with a higher value indicative of a catalyst more selective for CO oxidation over $H_2$ oxidation.

As follows, Table 1 lists processing parameters and feed gas compositions for the testing of Catalysts A, B, C, and D.

TABLE 1

Processing parameters and feed gas compositions

| Catalyst composition | Feed gas composition (mole %) | | | | | GHSV* @STP (1/hr) | Average mass balance | Pressure (atm) |
|---|---|---|---|---|---|---|---|---|
| | $H_2$ | CO | $CO_2$ | $H_2O$ | $O_2$ | | | |
| A  2% Pt | 37.0 | 1.20 | 17.4 | 0.0 | 0.65 | 82,900 | — | 1.7 |
| B  0.10%Pb/2%Pt | 41.8 | 0.96 | 18.5 | 13.9 | 0.35 | 73,700 | 100.4 | 2.0 |
| C  0.15%Pb/2%Pt | 40.3 | 0.94 | 18.1 | 14.7 | 0.45 | 60,800 | 99.9 | 2.0 |
| D  0.15%Pb/2%Pt | 57.0 | 0.77 | 10.5 | 0.0 | 0.70 | 75,200 | — | 1.7 |

*GHSV @STP stands for gas hourly space velocity at standard temperature (0° C.) and pressure (1 atmosphere).

As shown in FIGS. 6–9, Catalysts, B, C, and D (Pb-containing catalysts (shown by squares, diamonds, and triangles)) are able to withstand greater temperatures while maintaining CO selectivity without resulting in undesirable reverse water/gas shift reactions and in methane formation than is Catalyst A (non-Pb containing catalyst (shown by asterisks)).

Figure 6:
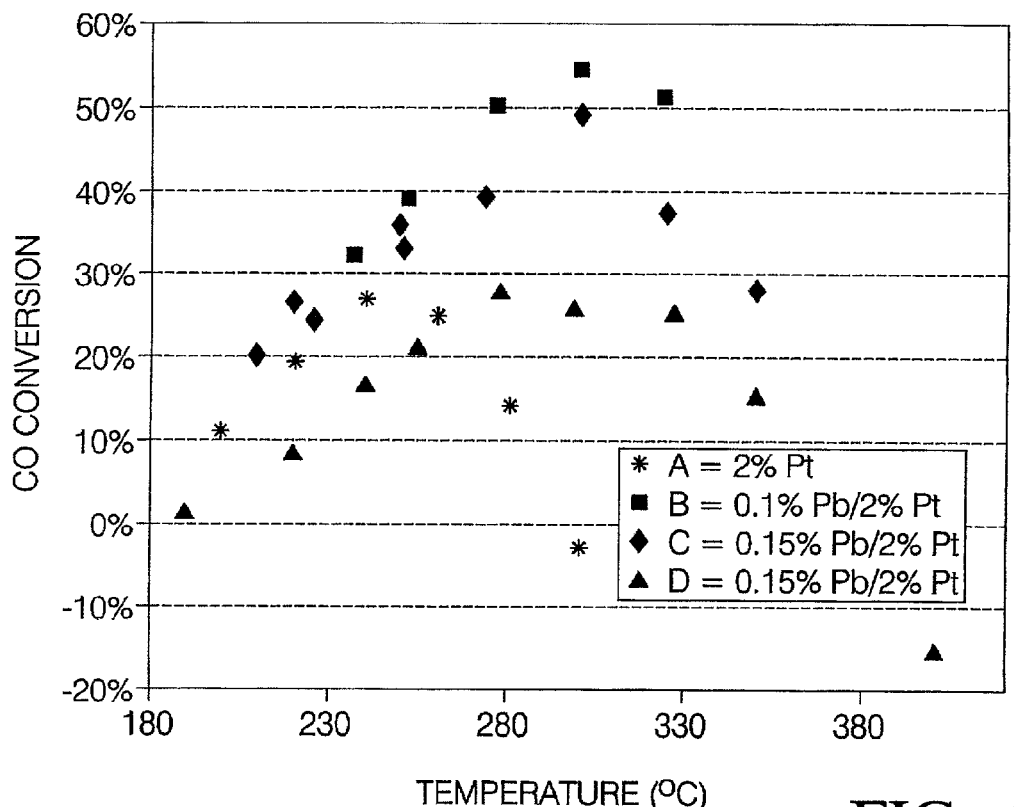
FIG. 6 is a graph illustrating the CO conversion as a function of temperature for unmodified and lead modified platinum catalysts supported on cordierite or zirconia-modified alumina.

For example, as shown in FIG. 6, at a temperature of 230° C., CO is oxidized to $CO_2$ by an increase of greater than 55% when the Pb-containing catalysts are used in place of the non-lead containing catalyst. Additionally, at 330° C., the non-lead containing catalyst exhibits undesirable reactions such as reverse water-gas shift reaction, wherein CO is generated (as shown by negative values). Pb-containing catalysts, however, show about 25 to about 55% oxidation of the CO even at this relatively high temperature. Therefore, the Pb-containing catalysts oxidize up to about 32% of the CO at temperatures exceeding 200° C., up to about 50% at temperatures exceeding 250° C., and up to about 52% at temperatures exceeding 300° C. In contrast, the non-Pb containing catalysts oxidized up to about 20% of the CO at temperatures exceeding 200° C., up to about 12% at temperatures exceeding 250° C., and about 0% at temperatures exceeding 300° C.

Figure 7:
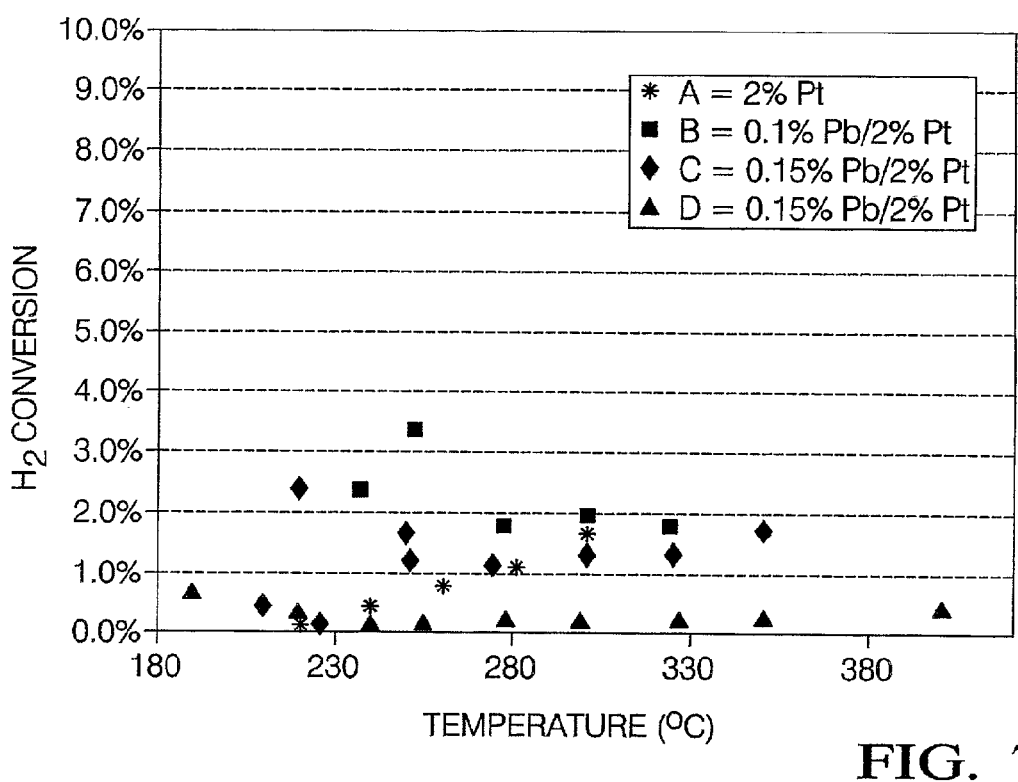
FIG. 7 is a graph illustrating the $H_2$ conversion as a function of temperature for unmodified and lead modified platinum catalysts supported on cordierite or zirconia-modified alumina.

FIG. 7 indicates that $H_2$ remains conserved by the catalyst despite the broad (200° C.) range in temperatures to which the catalyst is exposed; thereby suggesting that the catalyst effectively selects for CO and continues to conserve $H_2$ even over broad temperature ranges. For example, from about 180 to about 380° C., Catalyst D oxidizes only a minimum (about 0.1 to about 0.3%) of $H_2$ to $H_2O$; whereas, the non-Pb containing catalyst oxidizes about 1.0 to about 2.0% $H_2$ to $H_2O$. This conservation of $H_2$ by a catalyst serves as an efficient upstream method by which to preserve $H_2$ for use in fuel cells.

Figure 8:
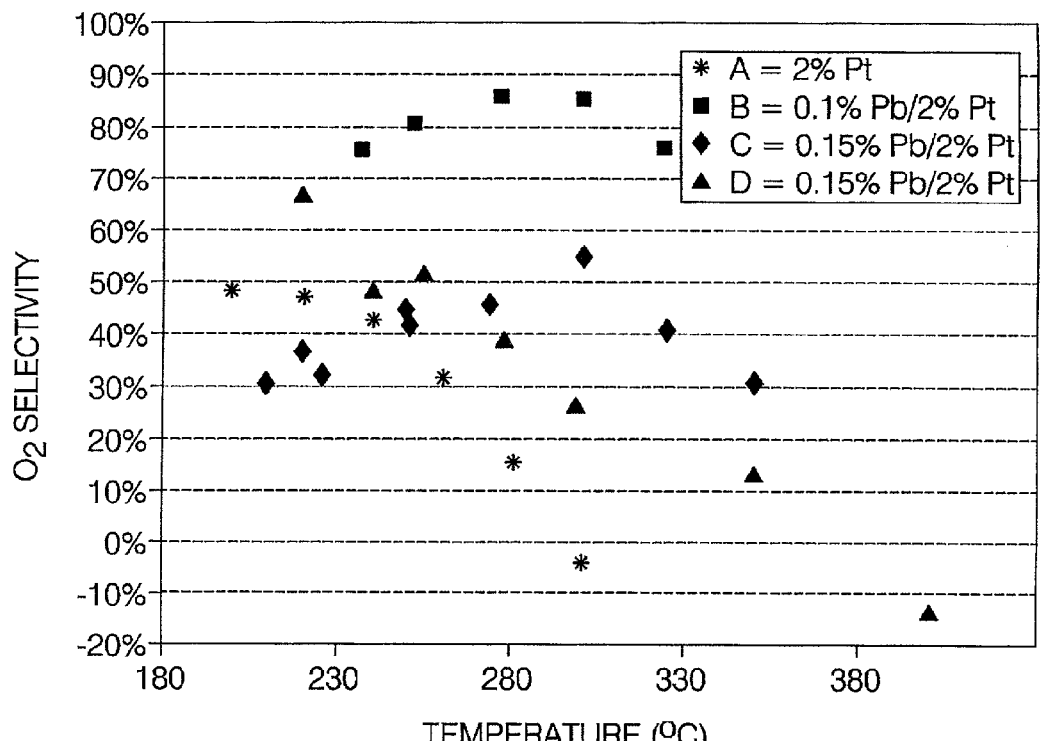
FIG. 8 is a graph illustrating the $O_2$ selectivity as a function of temperature for unmodified and lead modified platinum catalysts supported on cordierite or zirconia-modified alumina.

FIG. 8 further indicates that CO selectivity remains high even over the 200° C. temperature range for Pb-containing catalysts. For example, at temperatures of about 230° C., the Pb-containing catalysts show that about 30 to about 75% of the available $O_2$ selectively oxidizes CO; at about 280° C., about 40 to about 90% of the available $O_2$ selectively oxidizes CO; and at about 330° C., about 10 to about 75% of the available $O_2$ selectively oxidizes CO. Furthermore, the catalysts formed according to the disclosure herein continue to utilize available oxygen to oxidize CO, even at temperatures exceeding 300° C., at which point oxygen passing over traditional catalysts (asterisks in FIG. 8) stops being selective for CO (as shown by the negative values in FIG. 8).

Figure 9:
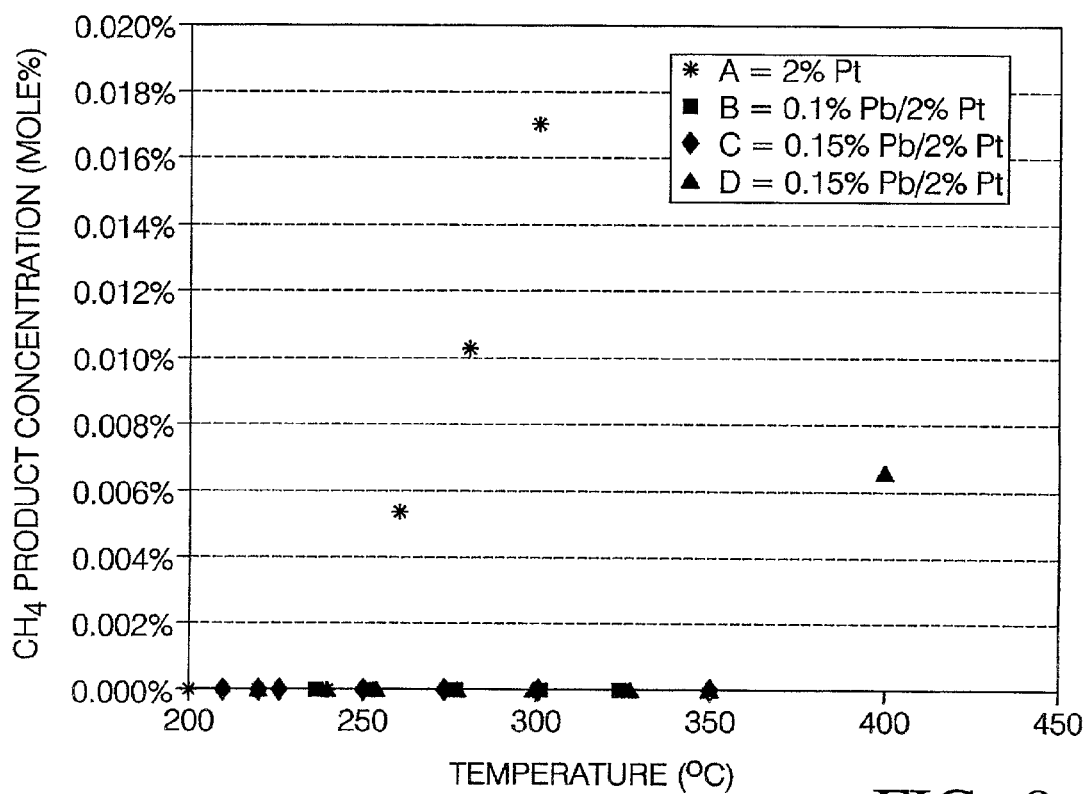
FIG. 9 is a graph illustrating the methane ($CH_4$) concentration in product as a function of temperature for unmodified and lead modified platinum catalysts supported on cordierite or zirconia-modified alumina.

FIG. 9 is useful in showing that even over the temperatures of about 180 to about 400° C., no measurable amount of $CH_4$ is formed by the catalyst; whereas, in the conventional catalyst made without the addition of the modifying agent, such as Pb, $CH_4$ is produced at concentrations ranging from about 0.017% to about 0.057% at temperatures ranging from about 250 to about 300° C., representing an undesirable catalysis of a unwanted side reaction. The formation of $CH_4$ is at the expense of consuming $H_2$, therefore lowering the efficiency of $H_2$ in the fuel processing system.

FIG. 9 is useful in showing that even over the temperatures of about 180 to about 400° C., no measurable amount of $CH_4$ is formed by the catalyst; whereas, in the conventional catalyst made without the addition of the modifying agent, such as Pb, $CH_4$ is produced at concentrations ranging from about 0.017 mole % to about 0.057 mole % at temperatures ranging from about 250 to about 300° C., representing an undesirable catalysis of a unwanted side reaction. The formation of $CH_4$ is at the expense of consuming $H_2$ therefore lowering the efficiency of $H_2$ in the fuel processing system.

An additional benefit to the CO-selective catalyst is its ability to oxidize CO over a wide range of temperatures, (e.g., temperatures of up to about 600° C., with up to about 500° C. preferred, and up to about 400° C. more preferred), and to reduce CO content to over a wide range of concentrations, (e.g., concentrations of less than about 500 ppm with up to about 250 ppm preferred, and up to about 100 ppm more preferred, and less than about 10 ppm possible, depending on selection of processing conditions) without creating polluting by-products such as $CH_4$. The ability to function over broad ranges of temperatures and product concentrations eliminates the problem of establishing a finely controlled mechanism for controlling temperature in a gas reforming system, for example.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fuel cell system comprising:
a fuel reformer for generating a feed stock comprising $H_2$ and CO;
a CO-selective oxidation reactor in fluid communication with said fuel reformer for treating said feed stock to oxidize CO, wherein said CO-selective oxidation reactor comprises a housing disposed around a substrate comprising a CO-selective oxidation catalyst comprising: a catalytic material selected from the group consisting of Pt, Pd, Rh, Ir, Os, Ru, Ta, Zr, Y, Ce, Ni, Cu, and oxides, alloys, and compounds thereof, a modifying agent selected from the group consisting of Pb, and alloys, nitrates, sulfides, and chlorides thereof in an amount of about 2 to about 25 atomic percent based on the total surface atoms of said catalytic material, and a support; and
a fuel cell in fluid communication with said CO-selective oxidation reactor.

2. The fuel cell system of claim 1, wherein said catalytic material is selected from the group consisting of Pt, Pd, Rh, Ir, and oxides, alloys, and compounds thereof.

3. The fuel cell system of claim 1, wherein said CO-selective catalyst comprises about 8 to about 15 atomic percent of said modifying agent.

4. The fuel cell system of claim 1, wherein said support is selected from the group consisting of alumina, titania, zirconia, and combinations comprising at least one of the foregoing supports.

5. The fuel cell system of claim 1, wherein the CO-selective oxidation catalyst comprises about 0.5 to about 5.0 wt % of said catalytic material, based upon a total weight of said catalytic material, said modifying agent, and said support.

6. The fuel cell system of claim 5, wherein the CO-selective oxidation catalyst comprises about 1.0 to about 3.5 wt % of said catalytic material.

7. The fuel cell system of claim 6, wherein the CO-selective oxidation catalyst comprises about 1.8 to about 2.5 wt 520 % of said catalytic material.

8. The fuel cell system of claim 1, wherein the CO-selective oxidation catalyst comprises about 0.01 to about 0.5 wt % of said modifying agent, based upon a total weight of said catalytic material, said modifying agent, and said support.

9. The fuel cell system of claim 8, wherein the CO-selective oxidation catalyst comprises about 0.05 to about 0.30 wt % of said modifying agent.

10. The fuel cell system of claim 9, wherein the CO-selective oxidation catalyst comprises about 0.10 to about 0.20 wt % of said modifying agent.

11. The fuel cell system of claim 1, wherein the wherein the CO-selective catalyst is capable of preferentially removing carbon monoxide over hydrogen removal.

12. The fuel cell system of claim 11, wherein the CO-selective catalyst is capable of the removal of the carbon monoxide in a feed stock while oxidizing less than about 3 mole % hydrogen in a feed from a reformer.

\* \* \* \* \*